Figure 1:
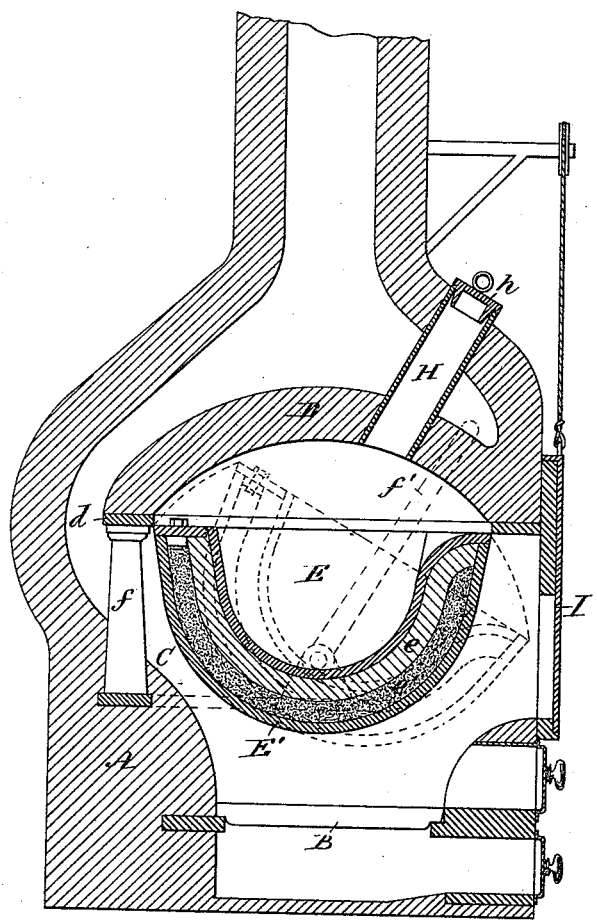

(No Model.) 4 Sheets—Sheet 1.
C. PAYEN.
METHOD OF MAKING POROUS CRYSTALLIZED METAL PLATES.
No. 440,272. Patented Nov. 11, 1890.

WITNESSES:
Hermann Bormann
Thomas M. Smith

INVENTOR:
Clement Payen,
By J. Walter Douglass.
Atty.

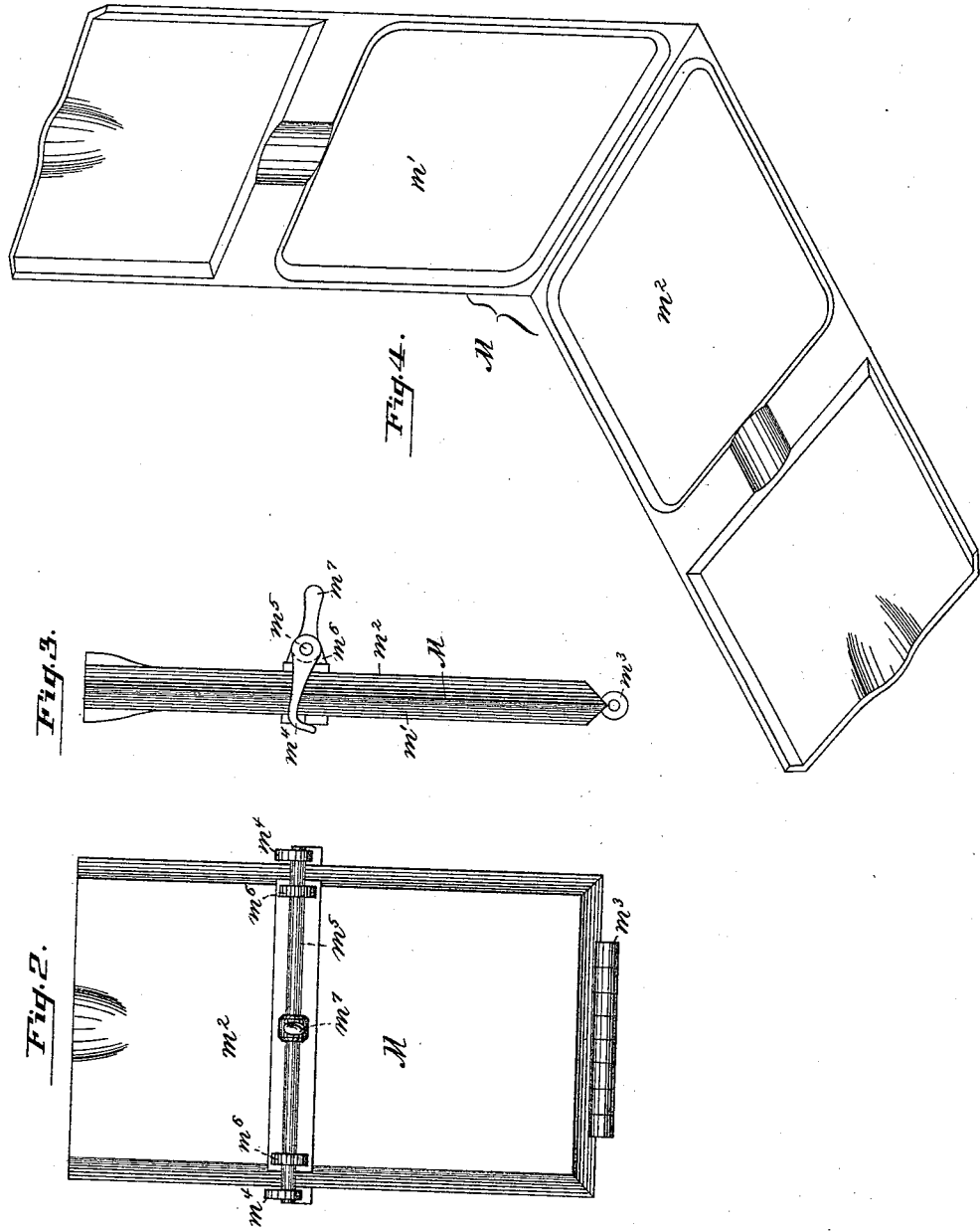

(No Model.) 4 Sheets—Sheet 3.
C. PAYEN.
METHOD OF MAKING POROUS CRYSTALLIZED METAL PLATES.
No. 440,272. Patented Nov. 11, 1890.
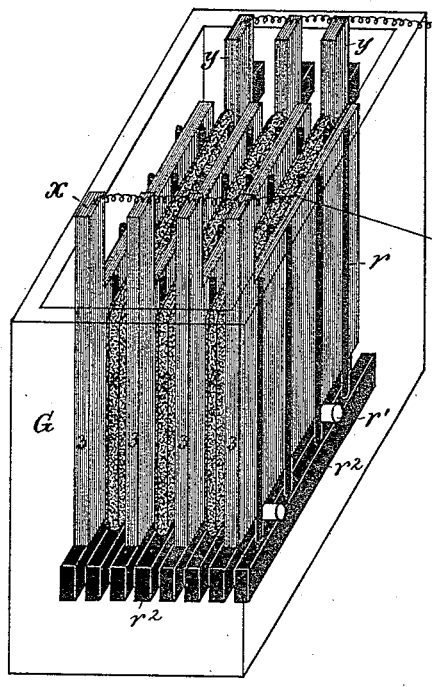
Fig. 5.
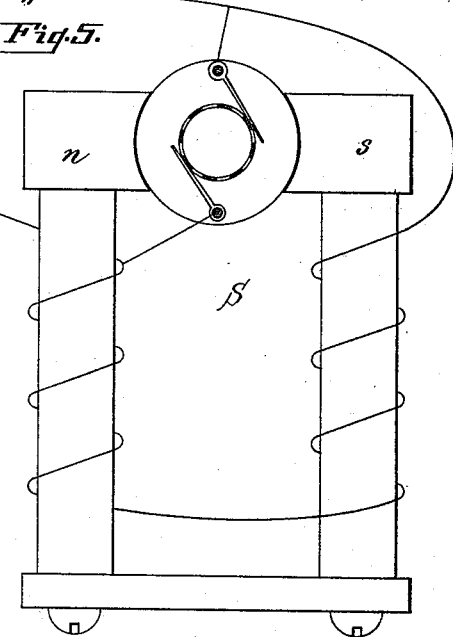
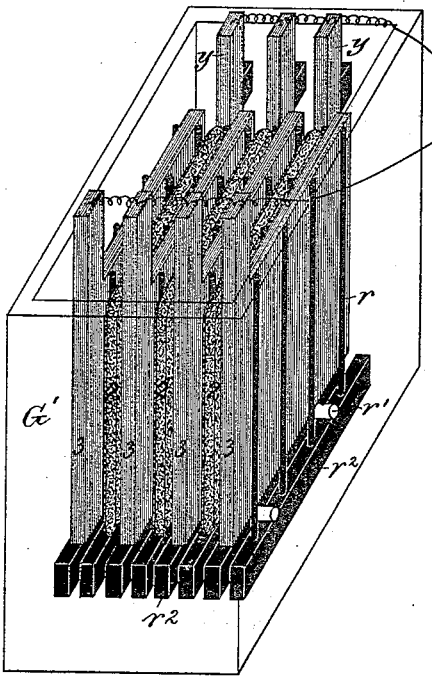
Fig. 6.
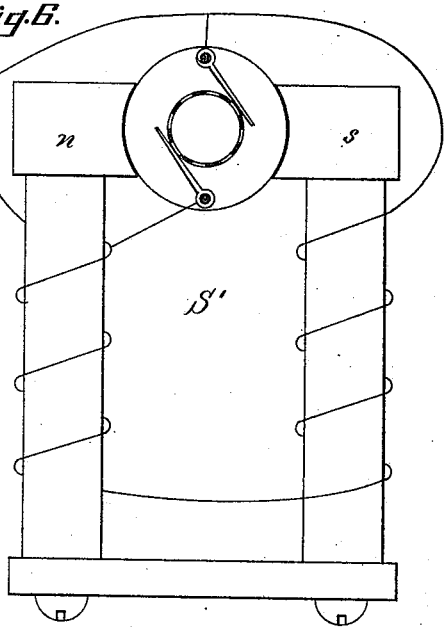
WITNESSES:
Hermann Bormann
Thomas M. Smith.
INVENTOR:
Clement Payen,
By J. Walter Douglass.
Atty.

(No Model.) 4 Sheets—Sheet 4.
C. PAYEN.
METHOD OF MAKING POROUS CRYSTALLIZED METAL PLATES.
No. 440,272. Patented Nov. 11, 1890.
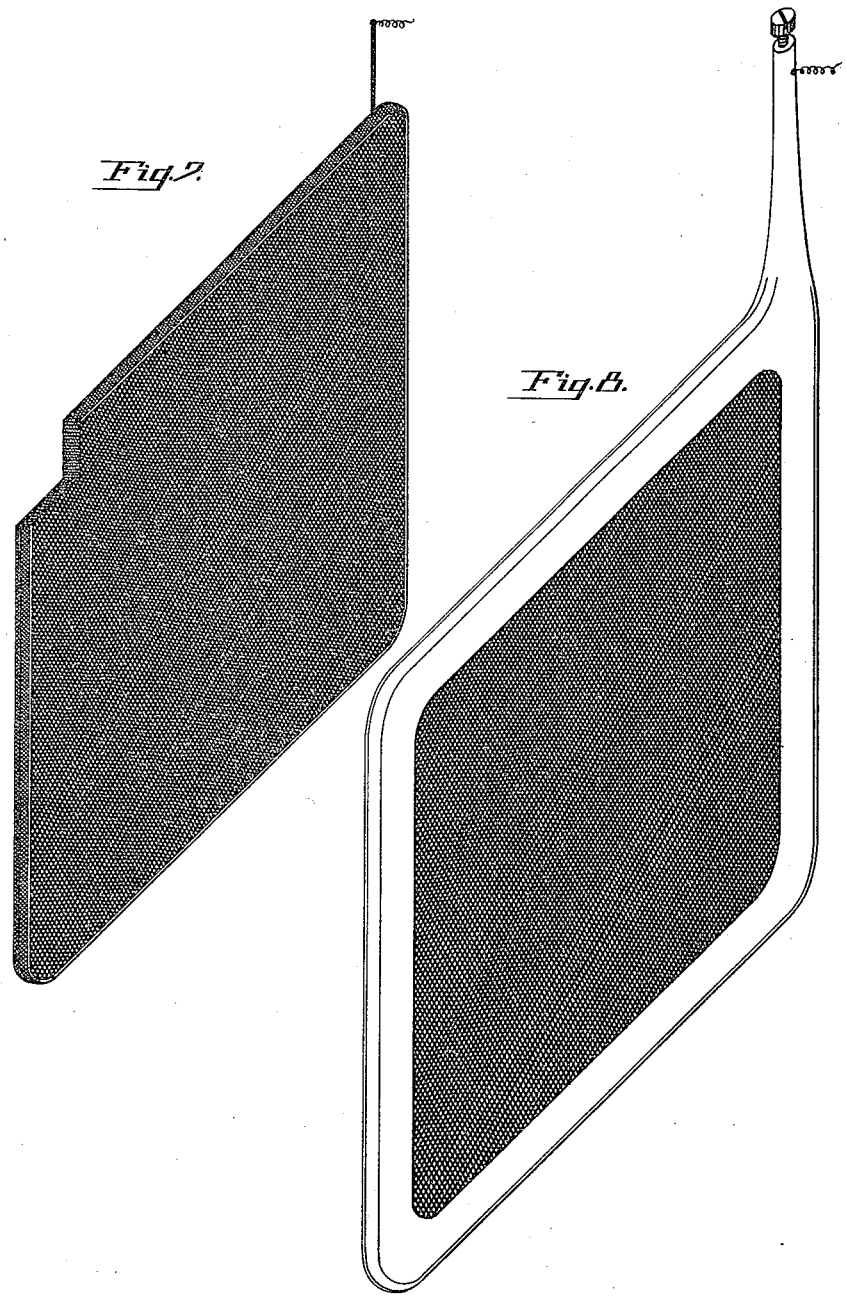

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

METHOD OF MAKING POROUS CRYSTALLIZED METAL PLATES.

SPECIFICATION forming part of Letters Patent No. 440,272, dated November 11, 1890.

Application filed June 16, 1888. Serial No. 277,359. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Method of Making Porous Crystallized Metal Plates, of which the following is a specification.

My invention has relation to the manufacture of the plates or elements of a secondary or storage battery.

The principal objects of my invention are, first, to provide a strong porous crystallized plate or element produced from a fusible salt or salts of a metal or metals mixed with a salt or salts of a metal or metals not fused or decomposed below a red heat, and, second, to provide a metallic plate or element having the crystals existing therein at right angles, or substantially so, to the surface thereof.

My invention consists, essentially, in mixing and melting a fusible salt or chlorides of a metal or metals with a salt or salts of a metal or metals not decomposed or fused below a red heat, and after the mass has become sufficiently fluid discharging the mass into a mold in order that it may assume a crystallized form in the cooling thereof, and then reducing the cast structure and eliminating foreign matter therefrom, so that the finished product may be caused to assume a porous crystallized metallic state or condition for use.

In the accompanying drawings is illustrated apparatus for the conduct of the steps for producing a porous crystallized metal plate or element, and in which—

Figure 1 is a vertical central section of a furnace with a crucible pivotally supported therein. Fig. 2 is a top or plan view of a mold wherein the mass is caused to assume a crystallized form. Fig. 3 is an end view thereof. Fig. 4 is a perspective view of said mold, showing the interior formation thereof. Figs. 5 and 6 are diagrammatic views of a double electrolysis for reducing the plates to a metallic state and for eliminating foreign matter therefrom, and Figs. 7 and 8 are perspective views of crystallized metal plates or elements with and without supporting-frames, and showing the preservation of the crystals therein and with the cells formed between them.

Referring to the drawings, A is a furnace constructed of brick or other suitable material.

B is the fire-grate, supported in the lower part of the furnace.

C is the draft-flue.

D is an arch in the upper part of the furnace, of brick or other refractory material, and supported by a ring $d$, which is held in position by means of columns $f$, arranged and supported in the brick-work of the furnace in any preferred manner.

E is a crucible open at the top, and around which is formed a layer of amianthus, asbestus, or other material, forming a capsule $e$, and between this capsule $e$ and the metal-pot E' is formed a layer of sand $e'$. The metal-pot E' is operated from the outside by a lever $f$, attached to one of the journals of said pot, in order that the crucible may be readily tilted for discharging the contents for further treatment.

H is an inclined hopper provided with a removable stopper $h$, through which the material is charged into the crucible.

I is a door to permit of the discharge of the fused mass into a mold for causing the same in cooling to assume a crystallized form.

The method of producing a plate or element for an electric battery embodying the features of my invention may be carried into effect in the following manner: To a charge consisting of chloride of lead is added two per cent., by weight, (more or less,) of sulphate of lime, and the mass after being fused and cast in a suitable mold is reduced to a porous metallic state or condition. Again, to a charge composed of the sulphate and chloride of lead is added from two to five per cent. of magnesia or similar material, and the mass treated in the manner hereinbefore described to permit the same to arrive at a state or condition for use. Again, to a charge composed of the sulphate, nitrate, and chloride of lead is added from two to five per cent., by weight, (more or less,) of sulphate of baryta or equivalent material, and the mass fused, cast, and reduced to a metallic state, either electrolytically or chemically, or by both methods of treatment, to form an element of an electric battery. Again, to a charge composed of the chlorides of lead and zinc is added from two (2) to ten (10) per cent., by weight, (more or less,) of the sulphates of lime and baryta, and the mass or mixture then fused, molded, and reduced to a porous metallic state in the manner hereinafter fully described. A series of the crystallized plates is placed in a vase G, containing water and sulphuric acid in the proportion of ten (10) per cent., more or less. The crystallized plates 2 immersed in the solution in the vase G are alternated with plates of equal dimensions composed of lead, charcoal, or other material 3, each having a terminal $x$, all the crystallized plates 2 being connected through their terminals $y$ with a wire 4, while the lead, charcoal, or other plates 3 are connected through their terminals $x$ with a wire 5. The two systems of plates are then properly insulated from each other and the vase G in the manner as shown in Fig. 5, the system of crystallized plates being connected with the negative electrode $s$ of a dynamo S, while the system of lead, charcoal, or other plates are connected with the positive electrode $n$ of the dynamo S, and the electrolytic action then allowed to take place. The crystallized plates thus treated are then removed and immersed in another vase G', containing water and sulphuric acid in about the same proportions hereinbefore mentioned. In this second vase G' the crystallized plates are again alternated with others of ordinary lead, charcoal, or other material, as in the previous instance, and the two systems of plates, insulated, respectively, from each other and the vase G', are again connected by two separate wires 6 and 7 with the positive and negative electrodes $n$ and $s$ of a dynamo S', as in the first instance mentioned, with this exception, that the negative electrode $s$ is connected with the system of lead, charcoal, or other plates through the terminals $x$, while the positive electrode $n$ is connected with the system of crystallized plates through the terminals $y$, as shown in Fig. 6. By the electrolytic action taking place the plates are reduced to a metallic state or condition.

Still another method may be resorted to for the reduction of the crystallized plates to a metallic state by chemical action, and may be carried out in the following manner: In a vase containing a solution of a chloride or salt and water, preferably dilute sal-ammoniac in the proportion of five (5) to ten (10) per cent., more or less, a series of the crystallized plates are arranged alternately in contact with metallic zinc or other plates of equal dimensions. The best results may be obtained by selecting metallic or other plates for contact with the crystallized plates having a greater affinity for the foreign matters or elements contained in said crystallized plates than those plates have for such elements. By exercising care in the selection of the plates and of the solution to immerse the crystallized plates in excellent results may be readily obtained. If a series of crystallized plates arranged in contact with a series of metallic zinc plates of equal dimension be immersed in a solution composed of sal-ammoniac and water in a vase for from twelve to fifteen hours, more or less, the effect produced by the chemical action upon the crystallized plates will be to eliminate the gas contained in those plates and to cause the same to unite with the metallic zinc, forming soluble chloride of zinc, and also to cause the chlorides or other salts contained in the crystallized plates to combine with the solution in the vase, thereby leaving them in a strong porous crystallized metallic state. The crystallized porous metal plates treated in either of the above ways by chemical or electrolytic action, or both, may then be removed from the vase and thoroughly washed and then dried by a gentle heat, whereby they will be brought to a pure crystallized porous metallic state, as illustrated in Figs. 7 or 8, ready for use as the plates or elements of a secondary or storage battery.

Having thus described the nature and objects of my invention, what I claim as new, and desire to secure by Letters Patent, is—

1. The method of making a porous crystallized metal plate or element, which consists in mixing and melting a fusible metallic salt or salts with a salt or salts not decomposed or fused below a red heat, then pouring the mass into a mold to cool, and then reducing the same to a metallic state, substantially as and for the purposes described.

2. The method of making a porous crystallized metal plate or element, which consists in melting a readily-fusible salt or salts with a salt or salts not decomposed or fused below a red heat, then casting the mass in a mold, and reducing the same electrolytically to a metallic state, substantially as and for the purposes described.

In witness that I claim the foregoing as my invention I have hereunto set my hand in the presence of two subscribing witnesses.

CLÉMENT PAYEN.

Witnesses:
GEO. W. REED,
THOMAS M. SMITH.